United States Patent [19]
Lee et al.

[11] Patent Number: 5,914,925
[45] Date of Patent: Jun. 22, 1999

[54] DRDW DIFFERENTIAL PHASE TRACKING METHOD AND APPARATUS

[75] Inventors: Tzuo-Chang Lee, Webster; James A. Barnard, Scottsville, both of N.Y.

[73] Assignee: Eastman Kodak Company, Rochester, N.Y.

[21] Appl. No.: 09/003,924

[22] Filed: Jan. 7, 1998

Related U.S. Application Data

[60] Provisional application No. 60/035,806, Jan. 10, 1997.

[51] Int. Cl.$^6$ ...................................................... G11B 7/00
[52] U.S. Cl. ........................................ 369/44.41; 369/44.34
[58] Field of Search .............................. 369/44.41, 44.42, 369/124, 112, 44.23, 44.24, 44.34

[56] References Cited

U.S. PATENT DOCUMENTS

| | | |
|---|---|---|
| 4,467,462 | 8/1984 | Shibata . |
| 4,785,441 | 11/1988 | Tanaka et al. . |
| 4,924,455 | 5/1990 | Fujiie et al. . |
| 5,060,216 | 10/1991 | Suzuki et al. . |
| 5,406,540 | 4/1995 | Longman et al. . |
| 5,629,921 | 5/1997 | Eastman et al. ........................... 369/54 |
| 5,784,348 | 7/1998 | Eastman et al. ........................... 369/54 |

OTHER PUBLICATIONS

M. de Haan and Di Chen, Design Considerations of an Optical Digital Data Storage Drive.

*Primary Examiner*—Nabil Hindi
*Attorney, Agent, or Firm*—Raymond L. Owens

[57] ABSTRACT

A DRDW differential phase tracking method including the steps of writing marks to a groove on an optical storage media utilizing a write beam; reading the trailing edge of each mark which is in the process of formation by the same write beam; detecting the diagonal signal components from a quadrature photodetector positioned in the path of the write beam reflected from the optical storage media; and forming a tracking error signal either as a function of the difference between the two diagonal signals out of the quadrant detector or as a function of the differential phase between the two diagonal signals out of the quadrant detector.

2 Claims, 6 Drawing Sheets

DRDW DIFFERENTIAL PHASE TRACKING METHOD AND APPARATUS

CROSS-REFERENCE TO RELATED APPLICATIONS

The present application claims the benefit of U.S. Provisional Application 60/035,806, filed Jan. 10, 1997.

FIELD OF THE INVENTION

The invention relates generally to the field of optical read/write systems, and in particular to a differential phase tracking method for use in direct read during write (DRDW) systems.

BACKGROUND OF THE INVENTION

With the advent of high density optical recorders using CD recordable and CD RAM optical disk drives, the need to improve the positional accuracies (tighter focusing and tracking tolerances) and the quality of the written marks (smaller mark length deviation and mark width variation)is ever increasing. Such higher performance is needed to maintain a reasonable phase margin for the high density written data. As we enter the era of DVD, the improvement in the position and quality of written marks becomes even more critical.

The technique of "Direct Read During Write" (DRDW) has been used to determine if there is a tracking offset during write by comparing the DRDW signals with the wobble signal. Active correction of the tracking offset can be exercised via a servo loop once the track offset (error signal) is obtained.

The invention presented here proposes to obtain the tracking error signal during write by comparing the two diagonal signals out of the servo detector quad using the very beam that is also doing the writing. Since the signals we rely n are DRDW signals, we call this method the DRDW differential phase tracking method.

At least two current methods exist for differential phase tracking and they operate by reading individual marks fully formed already on the optical media. They are thus formulated as a read only method. The hereby proposed method, on the other hand, utilizes the fact that the marks are in the process of being formed, and the signature of the DRDW signals are significantly different from those of the marks fully formed already. Thus the proposed method is useful for write operation only. However, the merits of differential phase tracking, namely relative insensitivity to spot movement on the detector due to disk tilt or objective lens movement during tracking, is maintained.

SUMMARY OF THE INVENTION

The proposed DRDW differential phase tracking method and apparatus of this invention is dependent two facts: one is that the marks are in the process of forming, thus providing the asymmetry along the track by the DRDW process itself, and thereby making the method useful during the write operation; and the other is that marks are written on a grooved media which provides the asymmetry across the track when there is a tracking offset.

The present invention obtains the tracking error signal during write by comparing the two diagonal signals out of the servo detector quad. The method applies to the grooved media only but it is independent of whether there is wobble to the groove or not. We call this method the DRDW differential phase tracking method.

Since the differential phase tracking method is relatively insensitive to spot movement on the servo detector, it is attractive for minimizing tracking offset caused by the disk tilt and the objective movement during fine tracking. The prior art differential phase tracking method has taken advantage of this fact during the read mode. We, in this patent application, take advantage of it during the write mode.

Briefly summarized, according to the method of the present invention there is provided a DRDW differential phase tracking method comprising he steps of:

a) writing marks to a groove or to the land on an optical storage media utilizing a write beam;

b) reading the trailing edge of each mark which is hopping6 in the process of formation by the same write beam;

c) detecting diagonal signal components from a quadrature photodetector positioned in the path of the write beam reflected from the optical storage media; and d) forming a tracking error signal either as a function of the difference between the two diagonal signals out of the quadrant detector or as a function of the differential phase between the two diagonal signals out of the quadrant detector.

According to an apparatus embodiment of the invention there is provided a DRDW differential phase tracking apparatus for use with a grooved optical storage media comprising:

write means for writing marks to a groove on an optical storage media utilizing a write beam;

a quadrant photodetector positioned in the path of the write beam reflected from the optical storage media;

first and second summing means for providing first and second sum signals representing the sum of the outputs from the first and second, and third and fourth photodetectors of the quadrant photodetector, respectively;

third and fourth summing means for providing third and fourth sum signals representing the sum of the outputs from the first and third, and second and fourth photodetectors of the quadrant photodetector, respectively;

a first differential means connected to receive the first and second sum signals for providing a first difference output signal;

a second differential means connected to receive the third and fourth sum signals for providing a second difference output signal;

low pass filter means connected to receive the second difference output for providing a filtered difference output signal which is a differential DRDW signal;

whereby the first difference output signal is used during a reading operation on the disk wile the differential DRDW signal is switched in during a write operation only;

a servo compensation circuit connected to provide lead and lag compensation for the servo signals so that the servo feedback loop will maintain stability during active tracking; and means responsive to the tracking error signal and connected to the fine tracking actuator so that the tracking error signal is minimized.

From the foregoing it can be seen that it is a primary object of the present invention to provide improved track positional accuracy for marks being written onto a grooved optical media.

It is another object of the present invention to provide an improved optical tracking system by utilizing diagonal tracking signals from a quadrant detector.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

(1) These methods work on a grooved medium with or without any wobbles in the grooves;

(2) Since the differential phase tracking method is first order insensitive to beam movement on the detector, it works well in the presence of limited disk tilt and objective lens movement during tracking; and (3) This method can be used simultaneously with the method of DRDW write power compensation.

BRIEF DESCRIPTION OF THE DRAWINGS

To facilitate an understanding of the invention, identical reference numerals have been used throughout the specification and drawings, where possible, to designate identical elements.

DETAILED DESCRIPTION OF THE INVENTION

Figure 1:
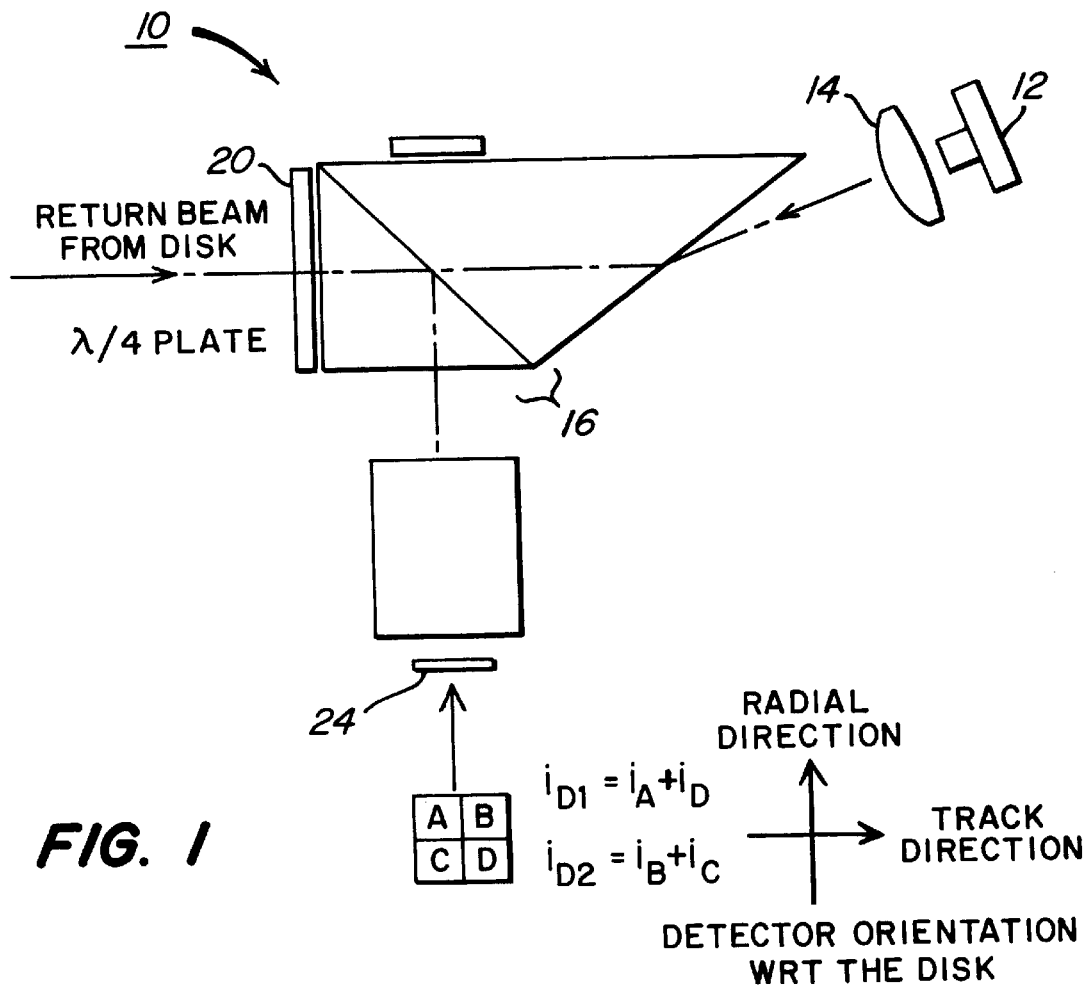
FIG. 1 illustrates an arrangement of components on which the method of the present invention is practiced.

A simplified layout of an optical head 10 is shown in FIG. 1. In the write mode of operation a laser diode 12 generates a beam having enough power to write onto an optical disk. The beam is normally collimated in a collimator 14 and directed to a pair of prisms 16. The 45° surface of the prism is coated to provide a polarization beam splitter. Generally a λ/4 plate 20 is utilized to convert the linearly polarized beam to a circularly polarized beam before it impinges on the optical disk (not shown). When the return beam from the disk traverses the λ/4 plate a second time it is converted to linear polarization again at 90° to the incoming polarization direction. Thus the return beam is reflected by the polarization beam splitter to a quadrant photo-detector 24 which provides signals that are further processed to extract a tracking error signal by performing a difference or a phase comparison of the two diagonal signals, namely:

$$i_{D1}=i_A+i_D \text{ VS } i_{D2}=i_B+i_C$$

Henceforth, for simplicity of discussion, we shall refer to $i_{D1}$ vs $i_{D2}$ as the differential DRDW signal, whether we use the difference or we compare the phase. If there are no grooves on the media, then this method would not work, because there would not be any phase difference between the two diagonal signals in spite of any track offset situation. For example this method would not work for a sample servo disk. If we have a grooved media, but we are not forming marks on the media, then we will also not be able to produce any differential phase signal in spite of an unbalanced "baseball" pattern. This is the case when we are reading the disk. However, in the presence of the grooves, if there is tracking offset during mark formation, then we will be able to generate a differential phase signal which, when processed, will provide the desired tracking error signal.

The reason that the differential DRDW signal exists at all is due to the coupling of the phase grating (the groove) with the mark. That is, when there is tracking offset, an asymmetrical phase environment in both x and y is created around the mark, causing the intensity at the pupil to be also asymmetrical in both x and y. The x asymmetry is due to the fact that the spot is always at the trailing edge of the mark being formed, while the y asymmetry is due to the tracking offset.

Figure 2:
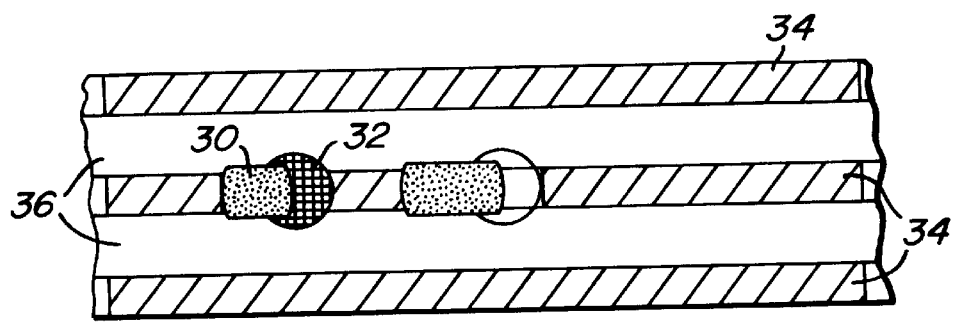
FIG. 2 is a top view of grooved segments in an optical disk.

Referring to FIG. 2, as the beam is reading the mark 30 that it is forming, the beam or optical spot 32 is always sampling the trailing edge of the mark being formed. The differential DRDW signal amplitude, $i_{D1}-i_{D2}$, is zero when the spot 32 is at the center of the track (groove 34); it will have one sign, say positive, when the optical spot 32 is on one side of the track 34, and it will have the opposite sign, negative, when it is on the other side of the track 34. As understood, each track is separated by a land 36.

Figure 3A:
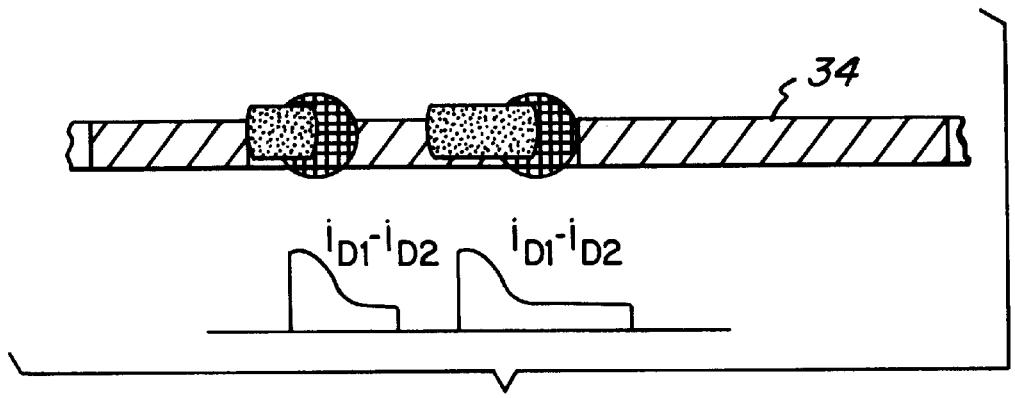
FIGS. 3A, 3B, and 3C illustrate the writing of a spot and the corresponding signals to the right (high) of a groove, in the center of the groove, and to the left (low) of the groove, respectively.
Figure 3B:
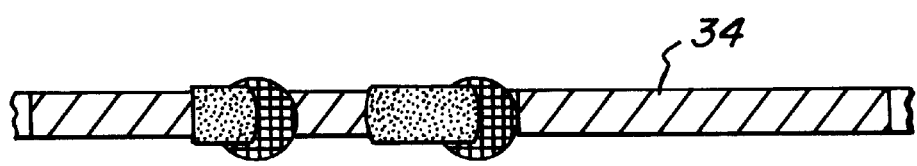
Figure 3C:
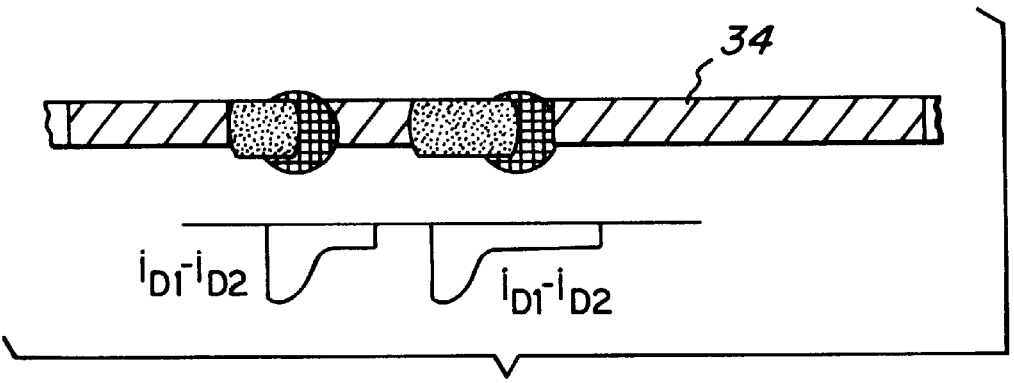

FIGS. 3A, 3B, and 3C illustrate these conditions. This differential DRDW signal needs further electronic processing in order to extract the tracking error signal.

Figure 4:
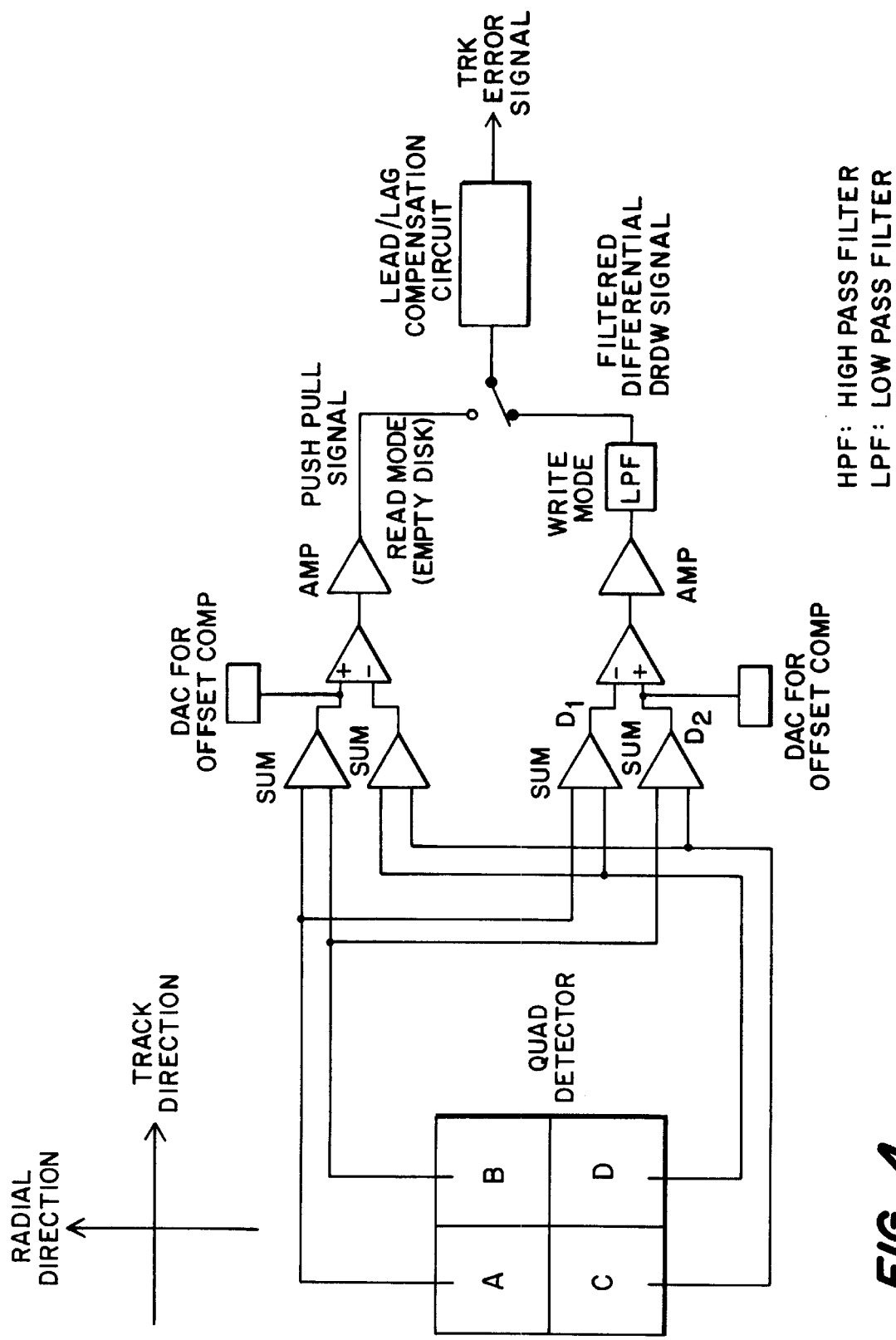
FIG. 4 is a block circuit diagram for implementing the differential DRDW signal using the difference of the two diagonal signals.

One signal processing method has been revealed in an earlier patent (U.S. Pat. No. 4,467,462, titled "Signal Detection System For Use in an Optically Reproducing Apparatus," by Shibata). A circuit for providing simpler signal processing is illustrated in FIG. 4. While the signal processing method taught in U.S. Pat. No. 4,467,462 is based on exploiting the quadrature phase difference relationship between the RF signal and the $i_{D1}-i_{D2}$ signal, the present method simply carries out a low pass filtering of the $i_{D1}-i_{D2}$ signal to obtain the tracking error signal.

Figure 5A:
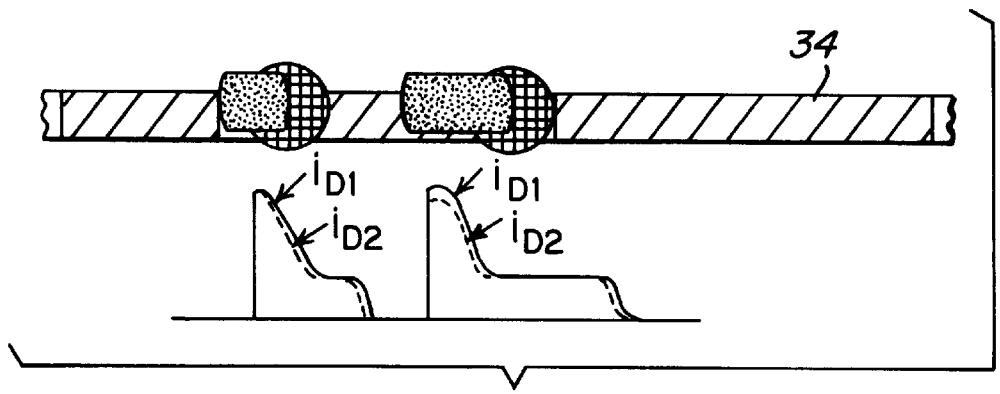
FIGS. 5A, 5B, and 5C illustrate occurrence of differential phase signals for the three tracking conditions of FIGS. 3A, 3B, and 3C.
Figure 5B:
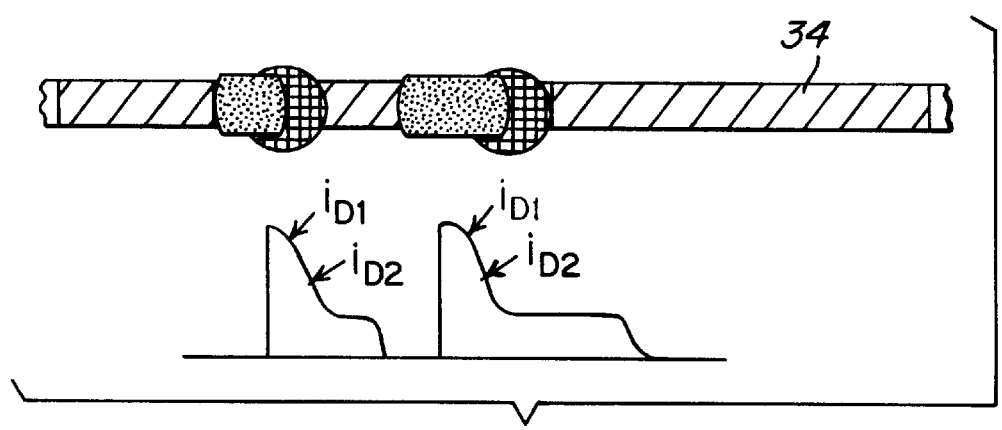
Figure 5C:
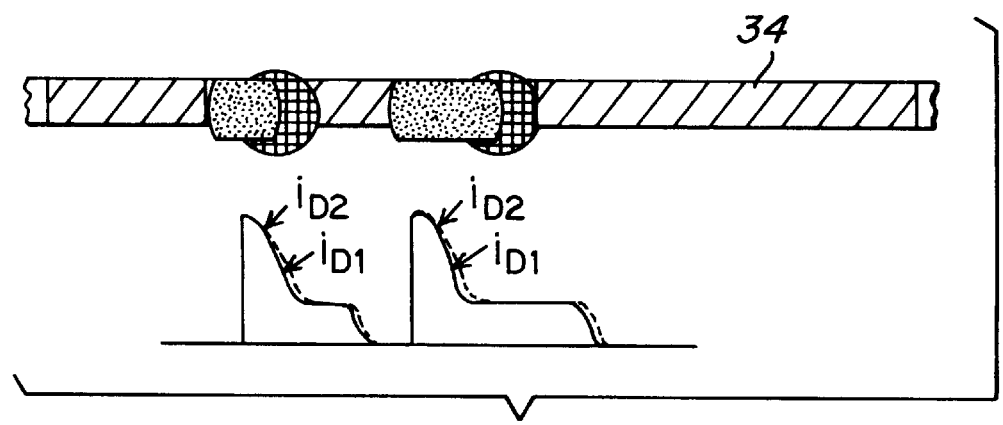
Figure 6A:
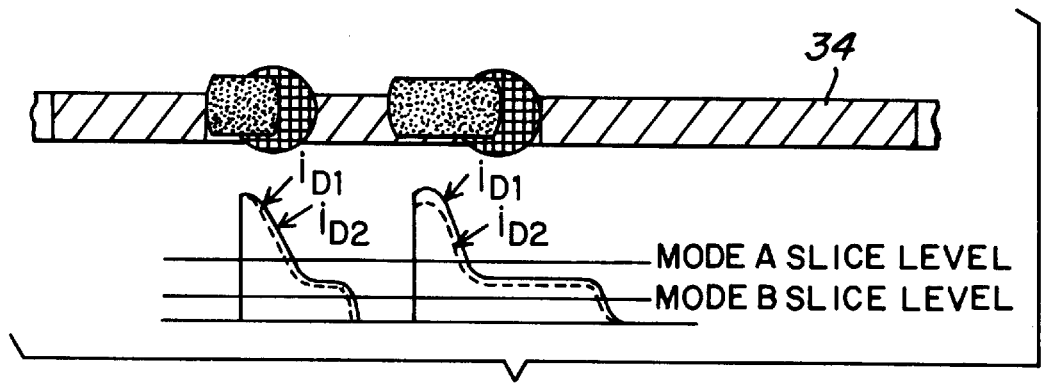
FIGS. 6A, 6B, and 6C illustrate two modes of implementing the DRDW differential phase tracking. Mode A slice level is suitable when the early formation stage of the mark is utilized for the extraction of the track error signal while slice level B is suitable when the concluding stage of the mark formation is utilized for the extraction of the track error signal.
Figure 6B:
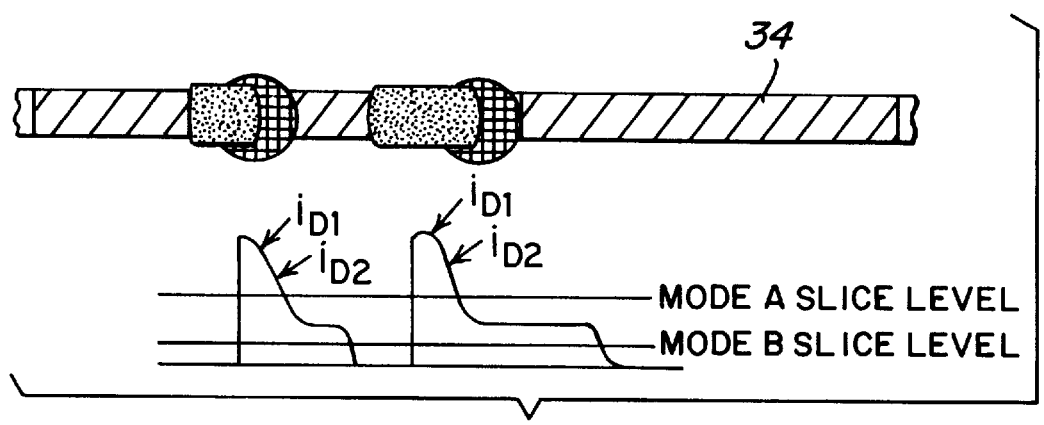
Figure 6C:
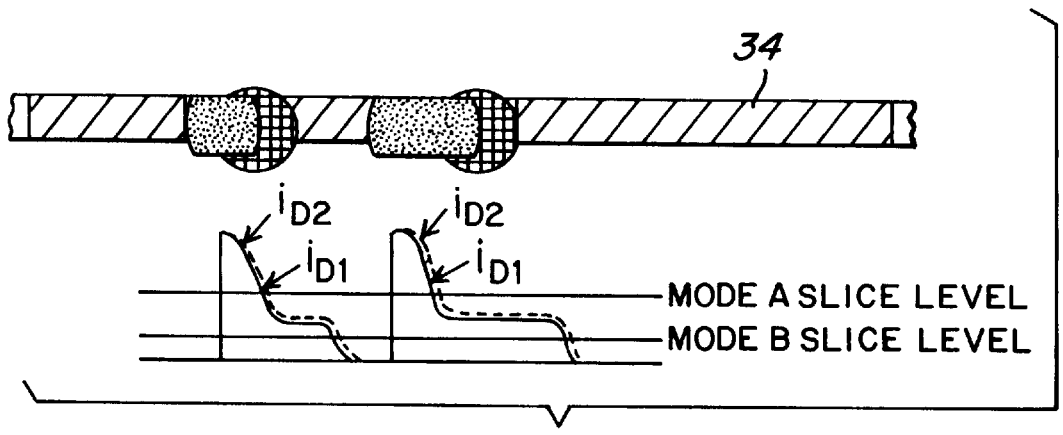

The present invention also provides for the comparison of the phase of the two diagonal signals as is illustrated in FIGS. 5A, 5B, and 5C in order to extract the tracking error signal. As illustrated in FIG. 5A where the beam spot is off to the upper side of the track, iD1 leads iD2 whilst in FIG. 5B where the beam spot is at the center of the track, iD1 and iD2 are identical whilst in FIG. 5C where the beam spot is off to the lower side of the track, iD1 lags iD2. Furthermore, we can incur two modes of phase error extraction for the diagonal signals as shown in FIGS. 6A through 6C. Mode A employs a larger slice level and is suitable when the early formation stage of the mark is utilized for the extraction of the track error signal while mode B employs a lower slice level and is suitable when the concluding stage of the mark formation is utilized for the extraction of the track error signal.

Figure 7:
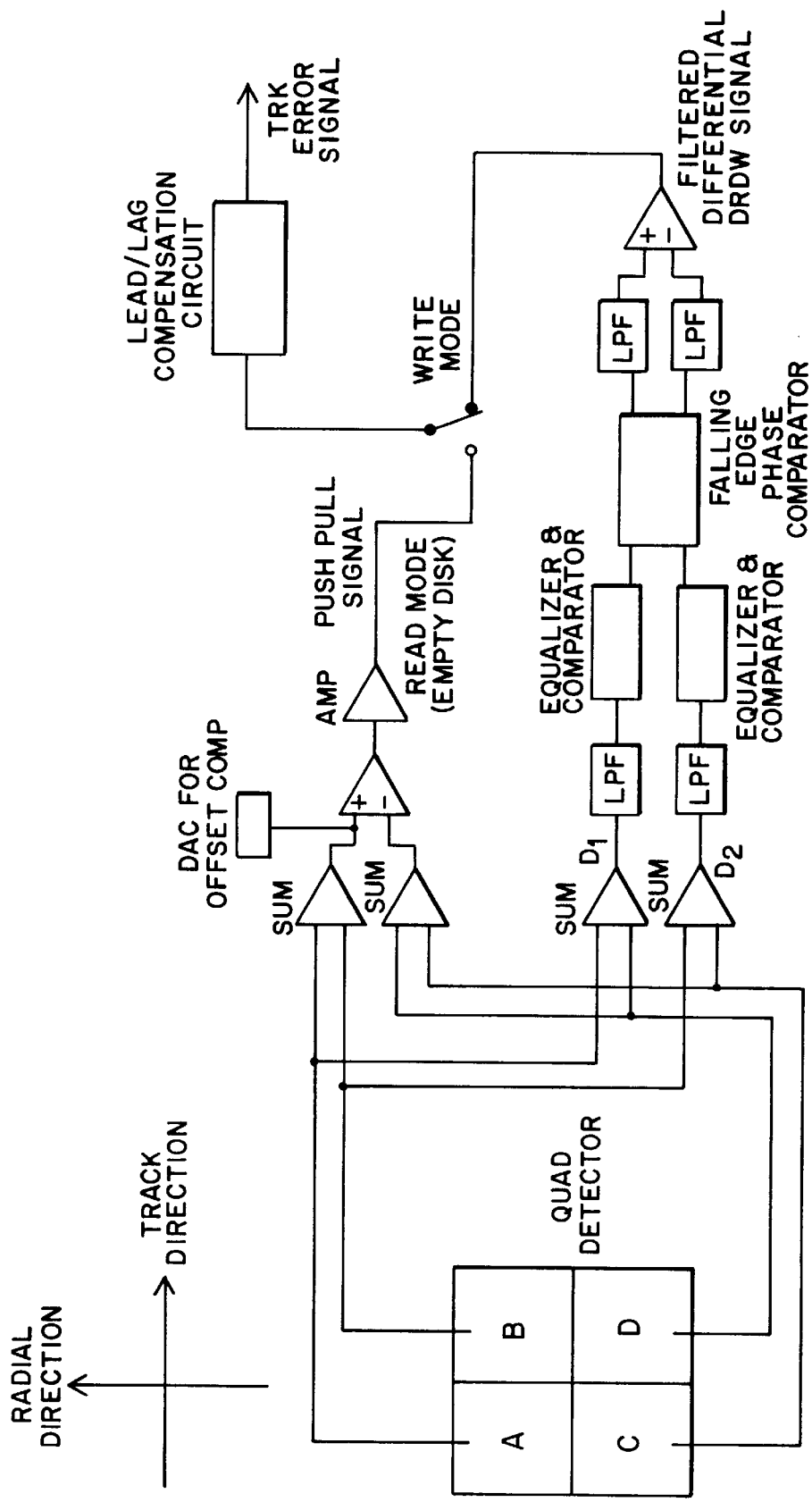
FIG. 7 is a block circuit diagram for implementing track error extraction via the differential DRDW phase signal.

The circuit block diagram for extracting this phase difference and converting it to a tracking error signal is shown in FIG. 7. It bears similarity to the one disclosed in an earlier patent.(U.S. Pat. No. 4,785,441, titled "Tracking Error Correction Apparatus Utilizing Phase Difference Information Derived From Four Photocells," by Tanaka, et al.) The present circuit uses a falling edge phase detector rather than a rising edge phase detector.

Analysis of the origin of the differential DRDW signal:

For simplicity, we assume pure phase marks formed on the grooves, then, $$a(x, y) = B_m(x, y) \exp[i(\theta/2)(1-f(x, y))] G(y) \qquad \text{Equation 1}$$

where, a(x, y) is the complex optical amplitude reflected from the media in the immediate vicinity of the medium. $B_m(x, y)$ is the complex optical amplitude incident on the media. G(y) is the 1-D phase grating, that is, the grooved structure of the medium. θ is the round trip phase depth of the marks, and, $f(x,y)=\pm 1$, where +1 is used when there is no mark formation on the disk and −1 is used when there is a mark.

Equation 1 can be expressed as, $$a(x, y) = \exp(i\theta/2) B_m(x, y) [\cos(\theta/2) + i \sin(\theta/2) f(x+\Delta x, y)] G(y+\delta) \qquad \text{Equation 2}$$

where Δx is the lead distance of the optical spot from the mark being formed, and δ is the track offset.

At the pupil (or at the quad detector) we have the far field of a(x, y), that is, $$A(k_x, k_y) = \cos(\theta/2) FT[Bm(x, y)G(y+\delta)] + i \sin(\theta/2) FT [Bm(x, y)G(y+\delta) f(x+\Delta x, y)] \qquad \text{Equation 3}$$

where FT stands for the 2D Fourier transform. The first term in Equation 3 is the well known push pull signal and it alone is incapable of generating a differential phase, while the second term in Equation 3 couples the grooves with the mark and creates asymmetry in both y and in x leading to differential phase.

The invention has been described with reference to a preferred embodiment; However, it will be appreciated that variations and modifications can be effected by a person of ordinary skill in the art without departing from the scope of the invention.

PARTS LIST optical head
laser diode
collimator
pair of prisms
λ/4 plate
photodetector
mark
beam or optical spot
track (groove)
land

What is claimed is:

1. A DRDW differential phase tracking apparatus for use with a grooved optical storage media comprising:

write means for writing marks to a groove on an optical storage media utilizing a write beam;

a quadrature photodetector positioned in the path of the write beam reflected from the optical storage media;

first and second summing means for providing first and second sum signals representing the sum of the outputs from the first and second, and third and fourth photodetectors of the quadphotodetector, respectively;

third and forth summing means for providing third and fourth sum signals representing the sum of the outputs from the first and third, and second and fourth photodetectors of the quadrant photodetector, respectively;

a first differential means connected to receive the first and second sum signals for providing a first difference output signal;

a second differential means connected to receive the third and fourth sum signals for providing a second difference output signal;

low pass filter means connected to receive the second difference output for providing a filtered difference output signal which is a differential DRDW signal;

whereby the first difference output signal is used during a reading operation on the disk, while the differential DRDW signal is switched in during a write operation only;

a servo compensation circuit connected to provide lead and lag compensation for the servo signals so that the servo feedback loop will maintain stability during active tracking; and means responsive to the tracking error signal and connected to the fine tracking actuator so that the tracking error signal is minimized.

2. A DRDW differential phase tracking apparatus for use with a grooved optical storage media comprising:

write means for writing marks to a groove on an optical storage media utilizing a write beam;

a quadrature photodetector positioned in the path of the write beam reflected from the optical storage media;

first and second summing means for providing first and second sum signals representing the sum of the outputs from the first and second, and third and fourth photodetectors of the quadphotodetector, respectively;

a first differential means connected to receive the first and second sum signals for providing a first difference output signal, commonly called the push pull signal;

third and forth summing means for providing third and fourth sum signals representing the sum of the outputs from the first and third, and second and fourth photodetectors of the quad photodetector, respectively;

a low pass channel filter cascaded with the equalizer and the comparator means with a set slicing level separately for the third and the fourth sum signals;

a phase comparator means to determine the lead/lag amount of the third sum signal with respect to the fourth sum signal;

the lead signal and the lag signal are separated into two different paths and independently averaged by means of a low pass filter followed by a difference amplifier whose output produces the differential DRDW signal;

whereas the push pull signal is used during reading operation on the disk, the differential DRDW signal is switched in during the write operation only;

a compensation circuit connected to provide lead and lag compensation for the servo signals so that the servo feedback loop will maintain stability during active tracking; and means responsive to the tracking error signal and connected to the fine tracking actuator so that the tracking error signal is minimized.

* * * * *